April 8, 1958 V. P. CARACCIOLO ET AL 2,829,399
EXTRUSION APPARATUS
Filed Feb. 4, 1954 2 Sheets-Sheet 1
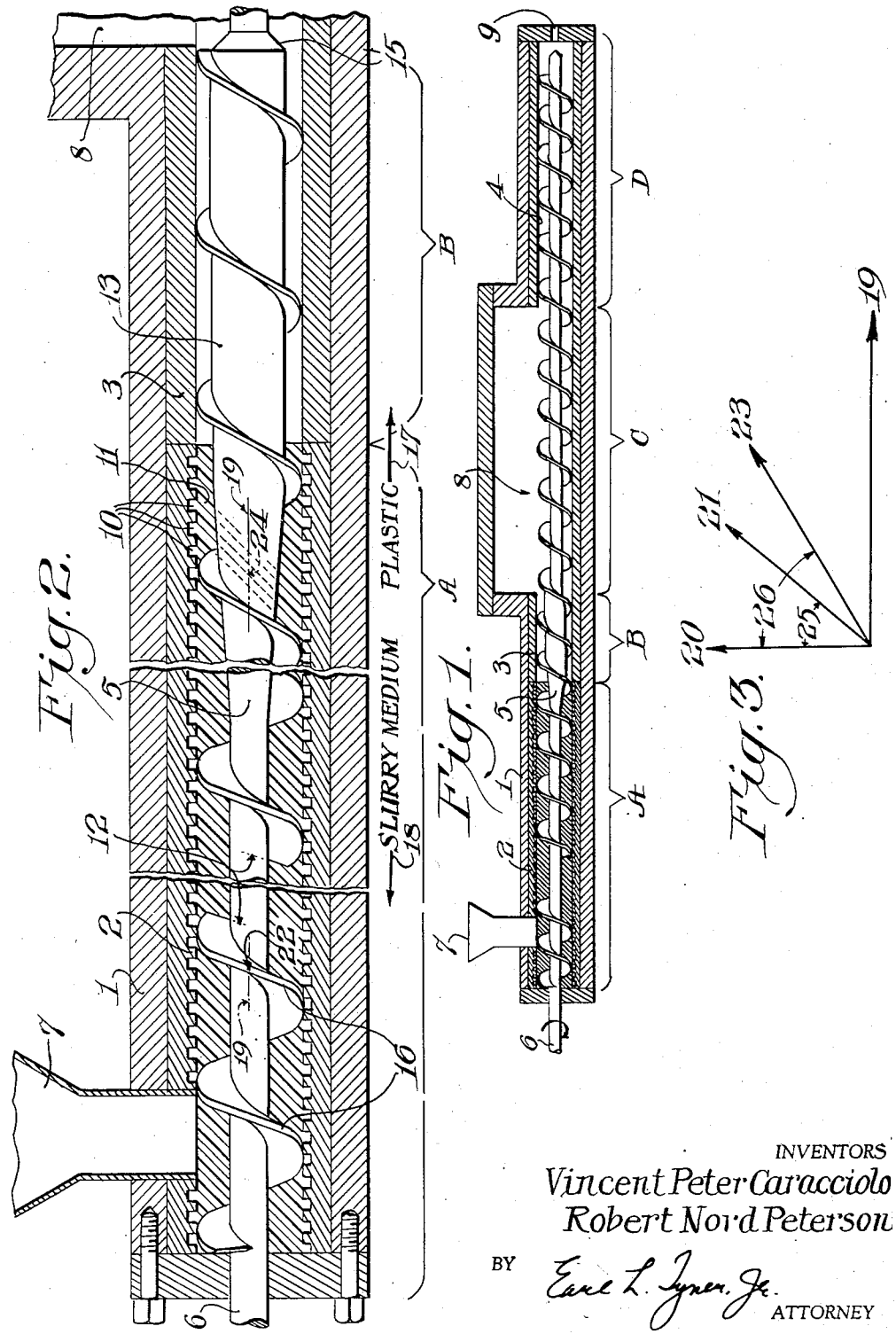
INVENTORS
Vincent Peter Caracciolo
Robert Nord Peterson
BY
ATTORNEY April 8, 1958 V. P. CARACCIOLO ET AL 2,829,399
EXTRUSION APPARATUS
Filed Feb. 4, 1954 2 Sheets-Sheet 2
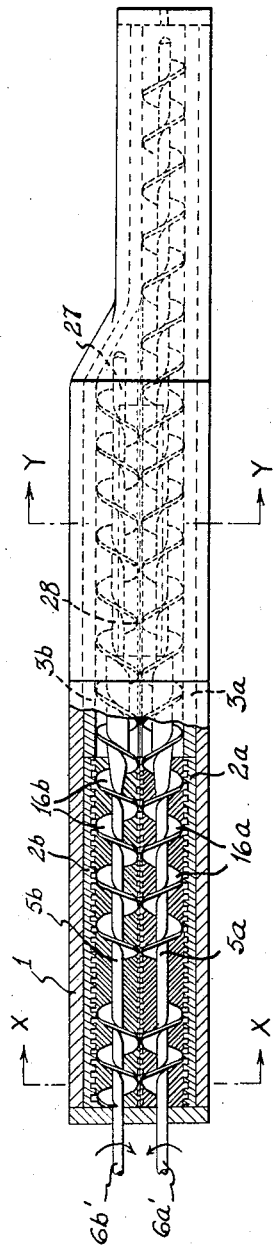
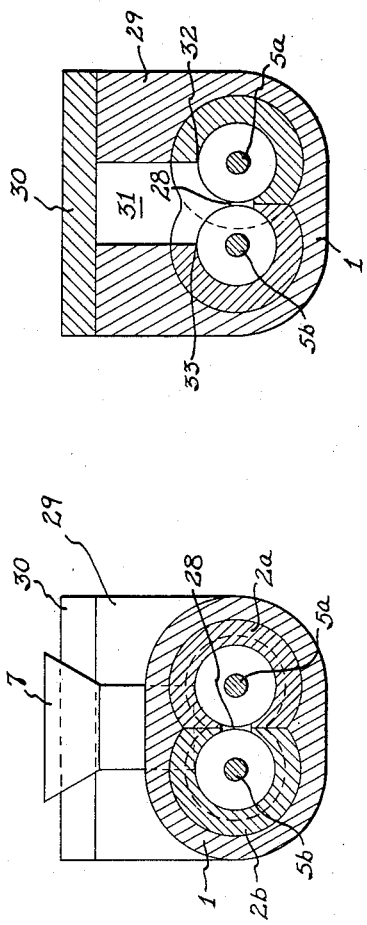
INVENTORS
Vincent Peter Caracciolo
Robert Nord Peterson
BY
ATTORNEY

United States Patent Office 2,829,399
Patented Apr. 8, 1958

2,829,399

EXTRUSION APPARATUS

Vincent Peter Caracciolo and Robert Nord Peterson, Wilmington, Del., assignors to E. I. du Pont de Nemours and Company, Wilmington, Del., a corporation of Delaware Application February 4, 1954, Serial No. 408,170

4 Claims. (Cl. 18—12)

This invention relates to a novel extrusion device and in particular this invention relates to an extrusion device for transforming an aqueous slurry of a synthetic plastic into a dry extruded melt of that plastic.

Many of the present day synthetic plastic materials are prepared in the form of granules which may then be transported in bulk form from the manufacturer to the fabricator who may then use any of the variety of methods for changing the bulk granular material into molded plastic articles. Some plastic materials are synthesized in the form of a slurry in which case the liquid medium must be removed in some manner if the plastic is to be prepared into a solid form such as granules or a sheet material or the like. Some of the known synthetic plastics may be separated from such a liquid medium by means of filtration, decanting, drying, and other means known to those skilled in the art. However, there are materials such as the polyacetals and in particular polyvinyl butyral which are conveniently prepared and easily handled in the form of an aqueous slurry, but when the liquid medium is removed the remaining plastic material becomes so tacky and sticky that an unmanageable mass of material results. Accordingly, it would be highly desirable if such a slurry could be processed in a single operation to produce a melted extrudate which might be in the form of a sheet or other desired shape.

It is an object of this invention to provide an extrusion device into which may be fed a liquid slurry of polymeric materials and out of which there is attained a melted extrudate free of the liquid medium in the feed material. It is another object of this invention to provide a method and an apparatus for removing large quantities of liquid in a feed material by means of a wringing action followed by a vacuum extraction zone wherein most of the remaining liquid is removed. Other objects will be apparent from the more detailed description of the invention given herein. In the attached drawings there is a schematic illustration of the apparatus of this invention.

Figure 1 is an overall cross sectional view of the extrusion device of this invention. Figure 2 is an enlarged cross sectional view of sections A and B of the device illustrated in Figure 1. Figure 3 is a graphic representation of the relationship between the helix angle of the screw and that of the grooves in the cooperating barrel. Figure 4 is a partial cross sectional view of one embodiment of this invention in which twin screws are employed in the extrusion device. Figure 5 is a cross sectional view taken at X—X in Figure 4. Figure 6 is a cross sectional view taken at Y—Y in Figure 4.

In Figure 1 the entire device is divided into four sections indicated by the letters A, B, C, and D. The section designated as A is known as the feed section. Section B is known as the compounding section. Section C is known as the extraction section. Section D is known as the extrusion section. The apparatus consists essentially of a casing, 1, lined with barrels 2, 3, and 4, into which there is fitted a screw device, 5, which is rotatably driven in the indicated direction by a suitable power source connected at 6. An aqueous slurry of plastic particles is continuously fed into section A through feed hopper 7. The slurry is advanced by the rotation of screw 5 through sections A, B, C, and D in that order. In section A the slurry is subjected to a wringing or compressing action whereby the major portion of the liquid medium (in the case of an aqueous slurry of polyvinyl butyral the liquid medium is water) is removed by forcing the liquid to travel in a direction opposite to that of the plastic material and to be discharged through feed hopper 7. By the time the plastic material has reached section B, it is a viscous melted material containing a small amount of the liquid medium introduced with the feed into hopper 7. In section B the root diameter of the screw has been increased to such an extent that the channel through which the plastic is travelling is considerably reduced in size and accordingly the pressure on the plastic material is increased. It is preferable that the root diameter of the screw is increased gradually from some point in the center of section A to the entrance of section B although such an increase in the root diameter may take place if desired over something less than a pitch length of the screw. At the entrance to section C the root diameter of the screw is reduced back to some decreased size which may be the same size as in sections A and D and accordingly pressure on the plastic material is immediately reduced. In section C the barrels, such as 3 or 4, surrounding the screw is cut away at the top so that in space 8 the plastic material being carried between the screw threads is not confined from the top. The space 8 is normally evacuated so that the material leaving section B under high pressure and temperature will be subjected to a flash evaporation upon entering section C and by reason of this evaporation, much of the remaining liquid in the plastic material will be removed. If it is convenient or desirable, the barrel which partially surrounds the screw in section C may be heated by steam coils, electric coils, or the like. Section D is merely an ordinary extrusion device wherein a smooth barrel 4 surrounds the screw 5 and plastic material is forced through the section and out a convenient die such as indicated at 9.

In Figure 2 there is shown an enlarged view of sections A and B of this device. For orientation purposes, feed hopper 7 and casing 1 are shown in their proper relationship to the remainder of the device. Barrel 2 is provided with a series of grooves 10 which are connected as indicated at 11 to form a multitude of helical grooves over the entire surface of the barrel 2 and therefore over the entire length of section A. These grooves are important in two respects. In the first place, the slurry material entering through feed hopper 7 does not adhere to the walls of barrel 2, probably because the water in the slurry acts as a lubricant, and hence the slurry material fills the spiral channels between screw threads such as indicated at 16 and turns with the rotation of screw 5 but is not advanced in the direction of intended travel because this material slips on the walls of barrel 2. By incorporating the helical grooves 11 in barrel 2, the plastic material contained in the channels between screw threads contacts itself rather than smooth metal surfaces. Grooves 11 become filled with plastic slurry, and the cohesion between plastic particles being carried by the screw threads and the same material in grooves 11 is sufficiently great that the material in the screw thread channels tends to cling to the material in grooves 11. Because of this increased friction, the rotation of screw 5 causes material in the screw thread channel to advance in the desired direction rather than to rotate with the screw without any advance relative to the screw. The grooves toward the end of section A serve to increase the capacity of the extrusion in that a molten plastic material also moves through these grooves in the direction of all other plastic material, that is, in the direction indicated by 17.

The second useful purpose which is served by the grooves 11 is that they offer a means by which water or other liquid medium used in the slurry entering feed hopper 7 may travel in the reverse direction to that of the plastic material being transported by screw 5. As the pressure on the plastic material in the screw thread channels is increased, the water or other slurry medium which is less viscous than the plastic material is forced out of the mass of moving plastic and because resistance to flow of such less viscous material decreases in the direction indicated by arrow 18, this liquid tends to flow in that direction. This liquid will of course take the path of least resistance and because the path through grooves 11 is generally shorter than the path defined by screw threads 16 the slurry medium may flow through these grooves if they are not completely plugged with plastic material. Furthermore, there is in every extrusion device, such as indicated in Figure 2, at least some small clearance between the outside diameter of screw threads 16 and the inside diameter of barrel 2. The slurry medium may actually short circuit the path of grooves 11 by flowing from one groove to an adjacent groove, and so on in a more or less straight path to the opening of feed hopper 7. Whatever may be the actual course of the slurry medium inside the extrusion device, there is a continual discharge of slurry medium from feed hopper 7, indicating a flow in the direction of 18 inside the extrusion device. If feed hopper 7 is of water tight construction, the slurry medium may rise in the feed hopper and be discharged as an overflow or it may be continuously pumped out. However, feed hopper 7 may be constructed in the manner of a sieve and water may flow out through any of a multitude of holes in feed hopper 7 which are sufficiently small to prohibit the loss of polymeric particles but sufficiently large to permit the passage of water.

Since the pressure applied to the moving plastic mass increases as the mass advances in the direction indicated by 17, the pressure will eventually reach a point where the water is forced out of the plastic and begins its travel in the direction of 18 to be discharged. The exact point where this wringing action will take place is not known definitely and will vary with the nature of the feed material introduced at 7, and with the characteristics and design of the extrusion device. It is probable that some wringing action begins immediately upon introduction of the feed material from 7 to the confines of the screw threads such as indicated at 16 and that the wringing action will continue through some length of section A as the pressure on the plastic material is increased.

In order to accomplish the wringing action at a definite point in the apparatus and to accomplish the wringing action in a more efficient manner, it is preferable, although not necessary, to remove a portion of the screw threads such as indicated at 12 in Figure 2. Since there is no screw thread in this zone, the plastic material is forced into a compact annular mass surrounding the shaft of screw 5 and must be advanced by pressure being applied by the plastic material advancing into this zone. Consequently, pressure is sharply increased as the plastic enters this zone and the major portion of the slurry medium is squeezed out and forced in the direction of 18. Normally, one pitch length of the screw thread or a length equal to the diameter of the screw, whichever is greater, is sufficient to accomplish the wringing action at this point, although a greater length will accomplish the same purpose. The removal of less than the above specified lengths of the screw thread may accomplish the desired result in certain embodiments of this invention, although these specified lengths are preferred for defining the screw thread interruption.

Plastic material leaving the zone indicated at 12 is again picked up by the screw threads and is advanced toward section B. In the space between the interruption of the screw threads and the entrance to section B the plastic material absorbs heat and acquires the nature of a melted plastic material becoming sticky and adhering to the walls of barrel 2, and accordingly grooves 11 are no longer necessary after the plastic acquires this adherent characteristic. Therefore, from the end of section A to the discharge of the plastic material from this device, the barrel surrounding the screw 5 is smooth and does not contain any grooves such as indicated at 11. A convenient and preferable method of increasing the pressure and temperature of the plastic mass moving from the interrupted thread zone to the end of section A is to have the root diameter of screw 5 increase gradually from the diameter employed in zone 12 to the diameter employed in section B. If desired, however, this increase in root diameter may take place over a shorter length of screw 5, for example, over the distance of a pitch length or less of screw 5.

Section B is short in length, usually no more than about two pitch lengths of screw 5. In this section the root diameter of screw 5 is at its maximum value having been increased to the diameter shown at 13. Such an increase in diameter offers a large resistance to the plastic material entering section B and accordingly the pressure on the plastic material and its temperature are greatly increased as the material is forced through section B. Such a restriction as indicated at section B may serve more than one purpose since this restriction may act as a metering device gauging the flow of plastic material through the entire extrusion device as well as increase the pressure and temperature of the plastic material just prior to its introduction into section C shown in Figure 1. Since there still remains in the plastic material a small amount of the slurry medium introduced at 7 and not removed by the wringing action in section A, the material may be subjected to a vacuum in section C to remove enough of the remaining slurry medium to produce the desired concentration in the final product. This medium may be present as a mixture with the plastic and/or dissolved in the plastic material. By increasing the pressure and temperature of the plastic material in section B and by sharply reducing the root diameter of screw 5 at 15 where the plastic material enters the vacuum zone of section C the evaporation of the slurry medium is greatly intensified by the sudden reduction in pressure at 15. In effect, there is therefore obtained a flash evaporation effect which speeds the removal of the remaining slurry medium in section C. If it is desirable, barrel 3 may be supplied with a means for heating such that the plastic material carried through sections B and C may be heated to accomplish better evaporation.

In Figure 3 there is shown a graphic representation of the relation between the helical angle of screw 5 and that of grooves 11 in section A of this device. By defining vector 19 as the direction of the axis of screw 5, vector 20 is a direction at right angles to the axis of screw 5. Vector 21 represents the tangent to the screw thread at the point where the screw thread crosses the axis in a projection view such as indicated by point 22 on Figure 2. Vector 23 indicates the direction of a tangent to a projection of grooves 11 at the intersection with axis 19, such as indicated at point 24. Angle 25 is herein defined as the helix angle of screw 5 and angle 26 is defined as the helix angle of grooves 11. The helix angle 25 may be of whatever value that is determined as being appropriate for a particular extrusion process, although a convenient value is an angle of about 18° which corresponds approximately to a screw thread having its pitch equal to its outside diameter. It has been found that for efficiency and practical operation the angle 26 is preferably greater than angle 25 and may even approach 90° in which case grooves 11 would be longitudinal and the straight lines parallel to the axis 19. In general, angle 26, the helix angle of grooves 11, should be some value between angle 25, the helix angle of the screw, and 90° but in no case less than about 10°, the preferred angle being from about 30° to about 60°. The relationship of these helices angles may be stated in another way by reference to the pitch length of these two helices thus the pitch length of the helix described by the grooves 11 should be not less than the pitch length of the helix described by screw 5. A preferred combination is to have the pitch length of grooves 11 be approximately twice the inside diameter of barrel 2 in combination with a pitch length of screw 5 approximately equal to the outside diameter of screw 5.

The direction of the twist of grooves 11 is opposite to that of the twist of screw 5 so that if one is a right hand twist the other is a left hand twist.

The cross section of grooves as indicated at 10 are conveniently formed in a rectangular shape although this is not a critical point. For a maximum efficiency the leading edge of each groove, that is the edge closer to feed hoppper 7, should be relatively sharp and define an angle not greater than 90°. The trailing edge of each groove, that is the edge closer to compounding section B, may be smoothly rounded, tapered, or sharp with little difference in efficiency occurring regardles of the shape of the trailing edge. It is generally preferable that the shape of the cross section of the grooves be shallow in a radial direction, that is, it is preferred that the width of a groove measured in an axial direction be no less than the depth of the groove measured in a radial direction. It is also preferable that the width of the groove be less than the width of the screw thread 16 at its outer diameter. The distance between grooves in an axial direction or in a direction perpendicular to the groove, whichever is more convenient, will depend upon the nature of the material which is to be processed by this device. In general, a large number of shallow grooves not less than 0.01 inch deep, and preferably more than about 1/16 inch deep, and at least 1/16 inch wide will provide a more efficient wringing action and enhance the advancement of plastic material by the screw threads in section A of the extruder. It is convenient to have the distance between grooves be approximately equal to the width of the groove. As an example of the above preferred limitations, a 2" diameter screw having a pitch equal to its outer diameter might have a screw thread approximately 3/8" thick at its outer diameter. The grooved barrel for such a screw might be provided with grooves approximately 3/16" wide by 1/8" deep and by spacing 12 of such grooves equal distance around the interior of the barrel the distance between grooves would be approximately 1/4". Grooves have been utilized successfully which have a depth of 0.01", although it is preferable that for screws having a diameter of 1" or greater that the groove depth be more than 0.01" and preferably not less than about 1/16".

In Figure 4 there is shown an embodiment of this invention in which two coacting screws are employed in the feed section, the compounding section, and the vacuum extraction section of the extrusion device. These three sections correspond to letters A, B, and C in Figure 1. Two screws, 5a and 5b are placed adjacent to one another and are identical in all manners throughout the first three sections of the extrusion device as mentioned above except that the screw threads 16a and 16b twist in an opposite direction with respect to each other. That is, screws threads 16a are a left-hand thread and screw threads 16b are a right-hand thread. Other than this difference, the two screws are identical throughout the first three sections of the device. It should be noted that the shafts, as indicated at 6a and 6b, are driven by suitable means and turn at the same speed in opposite directions to each other. Screw 5b terminates at the exit end of the vacuum extraction section as indicated generally at 27. In the feed section, the screws are surrounded by grooved barrels 2a and 2b. In the compounding section and the vacuum extraction section, smooth barrels 3a and 3b surround both screws 5a and 5b. The screws 5a and 5b are so mounted that there is a minute clearance between the outside diameters of the two respective screws as indicated generally at 28. From point 27, where screw 5b terminates, the flow of plastic material is forced into an extrusion section consisting of only a single screw which is the extension of screw 5a, this portion being exactly the same as section D shown in Figure 1.

Figure 5 indicates the general relationship of screws 5a and 5b, grooved barrels 2a and 2b, and the surrounding casing 1. It may be seen that there is a small clearance 28 between the outside diameter of each of the two screws. Feed hopper 7 is shown in a position such that it may allow plastic material to be fed to the general area between screws 5a and 5b. The vacuum extraction section comprises a box-like extension 29 superimposed upon casing 1 and a cover 30 for extension 29. This extension serves the purpose of uncovering the space above the two sections 5a and 5b permitting the application of a vacuum in this space so that water or other volatile material can be removed from the plastic material passing through this section of the extrusion device.

Figure 6 shows in greater detail the arrangement of the vacuum extraction section with an open space 31 extending substantially from the center line of screw 5a to the center line of screw 5b and upwards to cover 30. It may be seen therefore that as screws 5a and 5b rotate toward each other, plastic material moves from points 32 and 33 respectively toward clearance 28 and that at the moment the plastic material leaves the constriction at either of points 32 or 33, it is subjected to a vacuum in space 31 causing the plastic material to give up its dissolved or adsorbed water or other volatile material.

The following examples are provided to illustrate and not to limit the scope of this invention.

*Example 1.*—An extrusion apparatus consisting of a single screw and its barrel with a feed hopper and an exit die was tested to determine the increase in throughput obtained by using grooves barrels as compared to smooth barrels. The screw diameter was 2" and the grooves in the barrel were 1/16" wide by 1/16" deep. The materials extruded were (1) an aqueous slurry of polyvinyl butyral containing approximately 70% solids, (2) granular polymethyl methacrylate, and (3) granular polyethylene. The grooved barrel which was utilized contained twenty evenly spaced longitudinally straight grooves. By reference to Figure 3 of the attached drawings the angle 26 of the barrel used in these runs was 90°. The helix angle of the screw is defined elsewhere herein and is the same as angle 25 of Figure 3 of the attached drawings. The results of these runs are set forth in Table I showing comparative values of the extrusion of plastic materials in a smooth barrel and a barrel containing longitudinal grooves. In every case the grooved barrel produced a higher delivery rate.

Table I

| Run | Screw (2" outside diameter) | | Barrel | Feed material to extruder | Amount of delivery (grams per revolution of screw) | |
|---|---|---|---|---|---|---|
| | Root diameter (inches) | Helix angle, degrees | | | At 10 p. s. i. gauge extrusion pressure | At 20 p. s. i. gauge extrusion pressure |
| A | 0.5 | 10 | Smooth | Aqueous slurry of polyvinyl butyral (70% solids). | 3.9 | 3.4 |
| B | 0.5 | 10 | Grooved | ...do... | 9.3 | 9.0 |
| C | 0.5 | 30 | Smooth | ...do... | 3.0 | 2.2 |
| D | 0.5 | 30 | Grooved | ...do... | 6.2 | 6.0 |
| E | 1.5 | 20 | Smooth | Granular polymethyl methacrylate. | 8.5 | 6.7 |
| F | 1.5 | 20 | Grooved | ...do... | 14.1 | 11.5 |
| G | 1.5 | 20 | Smooth | Dry granular polyethylene. | 6.5 | 6.5 |
| H | 1.5 | 20 | Grooved | ...do... | 8.7 | 8.6 |
| J | 1.5 | 30 | Smooth | ...do... | 5.3 | 5.2 |
| K | 1.5 | 30 | Grooved | ...do... | 7.3 | 7.3 |
| L | 0.5 | 10 | Smooth | ...do... | 13.9 | 13.9 |
| M | 0.5 | 10 | Grooved | ...do... | 16.1 | 16.1 |

*Example 2.*—In this example an aqueous slurry of polyvinyl butyral (approximately 70% solids) was fed into a one-inch screw extruder maintained at about 150° C., and the delivery rate in grams per minute was measured as a function of the angular speed of the screw in revolutions per minute. A comparison was made between results obtained with a smooth barrel and with a helically grooved barrel. The grooves were 0.01" deep by 0.015" wide. The grooves were cut along the barrel in a helix having a direction of twist opposite to that of the screw and having a pitch equal to one thread per inch. The screw had a pitch of 1" and a root diameter which increased from ⅝" at the feed entrance to ¾" at the exit of the extruder over a length of 6". The results are listed in Table II showing the great improvement in throughput afforded by the use of a helically grooved barrel.

Table II

| Barrel | Screw speed, revolutions per minute | Throughput, grams per minute |
|---|---|---|
| Smooth | 10 | 3.0 |
| Grooved | 10 | 7.0 |
| Smooth | 20 | 6.0 |
| Grooved | 20 | 12.5 |
| Smooth | 30 | 9.2 |
| Grooved | 30 | 17.5 |
| Smooth | 40 | 11.5 |
| Grooved | 40 | 22.5 |
| Smooth | 50 | 14.5 |
| Grooved | 50 | 29.0 |

The materials which may be processed by the extrusion device of this invention may be any of a variety of synthetic plastic material which are produced in admixture with a liquid material which is desirably removed before the plastic material is extruded or otherwise formed into its final shape. For example, mixtures of water or organic liquids with polymers such as polyvinyl chloride, polyvinyl acetate, polystyrene, polyethylene, chlorosulfonated polyethylene, polyacrylates, polymethyl methacrylate, polyvinyl acetals, polyvinyl butyral, synthetic rubber materials, and the like, may be introduced in admixture with such water or organic liquid and processed in the device of this invention so as to remove the water or organic liquid and extrude a homogeneous blended melt of the desired plastic all in a single step.

Although the device of this invention has been described in terms of a single screw and barrel, it is not intended that such a limitation be imposed on this apparatus or process. The features of this invention are equally applicable to multiple screw extruders. One example of such is a twin screw extruder, wherein two screws which are identical, except that one has a right-hand thread while the other has a left-hand thread, are employed in a side-by-side relationship and are rotated toward each other in the nature of meshed gears or milling rolls. These multiple screws may be intermeshing or non-meshing with adjacent screws. A particularly good arrangement of a twin screw extrusion device in this invention is the employment of twin screws as shown in Figures 4, 5 and 6.

It is also intended that this device is not limited to the employment of screws and cooperating barrels having helical threads and grooves respectively, which have a constant pitch. In many embodiments of this invention it may be advantageous to employ a screw with a variable pitch in one or more of the described sections of the extrusion device. It may also be advantageous to employ, in the feed section a barrel whose grooves have a variable pitch. Various combinations of variable and constant pitch threads and grooves will be apparent to those skilled in the art; for example, a screw with a variable pitch thread in a barrel with constant pitch grooves, a screw with a variable pitch in the feed section and compounding section and a constant pitch in the vacuum extraction section and extrusion section. These, and other combinations, are intended to be included in the herein described invention.

The extrusion device of this invention is useful in the processing of many of a variety of plastic materials where it is desired to blend plasticizers, pigments, fillers, and other materials with a polymer in dispersion form and to produce an extrudate readily for molding into a desired shape. It will be appreciated that the exit of this device may be fitted with any of a variety of molds, dies, calendering rolls and other known devices which are useful in transforming a molten plastic into sheets, rods, tubes, and articles of any shape whatsoever.

We claim:

1. An extrusion apparatus comprising a barrel having a feed opening at one end and an opening at the other end from which the extrudate leaves the barrel, a helical screw rotatable with respect to the barrel and adapted to advance material from the feed end to the extrudate end of the barrel and a driving means for the rotatable screw, said apparatus comprising four sections in the following order: (1) a feed section wherein the inside surface of the barrel is provided with a multiplicity of shallow, helical parallel grooves the helix of which has a direction of twist opposite from that of said helical screw and has a pitch length greater than the pitch length of said helical screw, (2) a compounding section wherein the inside surface of said barrel is smooth and the annular cross sectional area between the barrel and the root of the screw is less than one-half of the corresponding cross sectional area in the feed section, (3) a vacuum extraction section, throughout the length of which, there is provided access to the helical screw, rotating within a smooth, close-fitting barrel, and a means by which vacuum may be applied to the space above the accessible portion of said screw, and (4) an extrusion section wherein said helical screw rotates within a smooth close-fitting barrel and is provided with an exit die through which plastic material may be extruded under pressure.

2. The apparatus of claim 1 in which the thread flight of said helical screw in said feed section is discontinuous for at least one pitch length of said helical screw, the discontinuous portion being placed not closer to the feed opening than one pitch length of said helical screw.

3. The apparatus of claim 1 in which the pitch length of said helical screw is approximately equal to the outer diameter of said screw and the pitch length of said helical parallel grooves is approximately equal to twice the inside diameter of said barrel, the grooves having a substantially rectangular shape whereby the width is less than the thickness of a thread of said screw at its outermost diameter, and the depth of said groove is less than its width.

4. An extrusion apparatus of the character described comprising the combination of a casing, a pair of peripherally adjacent parallel interconnecting barrels in the casing, a rotatably mounted helical screw in each barrel, one screw having a right-hand thread while the other has a left-hand thread, a driving means operably connected to the two screws so as to cause the screws to rotate toward each other; said apparatus being composed of four connected sections in the following order (1) a feed section wherein the inside surface of each barrel is provided with a multiplicity of shallow helical parallel grooves, the helix of which has a direction of twist opposite to that of its cooperating helical screw and has a pitch length greater than the pitch length of said helical screw, (2) a compounding section wherein the inside surface of each of said barrels is smooth and wherein the root diameter of the helical screw is increased with respect to the root diameter of the helical screw in the feed section such that the free volume per unit length of screw in the compounding section is less than half of the free volume of a corresponding length in the feed section, (3) a vacuum extraction section, throughout the length of which, there is provided access to the cooperating helical screws, rotating within smooth, close-fitting barrels, and a means by which a vacuum may be applied to the space above the accessible portion of said cooperating helical screws, and (4) an extrusion section wherein a single helical screw rotates within a single close fitting smooth barrel and is provided with an exit die through which plastic material may be extruded under pressure.

References Cited in the file of this patent

UNITED STATES PATENTS

| | | |
|---|---|---|
| 1,353,917 | Lambert | Sept. 28, 1920 |
| 1,904,884 | Royle | Apr. 18, 1933 |
| 2,046,378 | Haux | July 7, 1936 |
| 2,370,469 | Johnson et al. | Feb. 27, 1945 |
| 2,547,000 | Gray | Apr. 3, 1951 |
| 2,547,151 | Braeseke | Apr. 3, 1951 |
| 2,549,997 | Zies et al. | Apr. 24, 1951 |
| 2,615,199 | Fuller | Oct. 28, 1952 |
| 2,744,287 | Parshall et al. | May 8, 1956 |